March 4, 1941.　　　D. R. P. HEATON　　　2,233,528
DEVICE FOR MAKING COFFEE OR THE LIKE
Filed Oct. 6, 1939　　　2 Sheets-Sheet 1
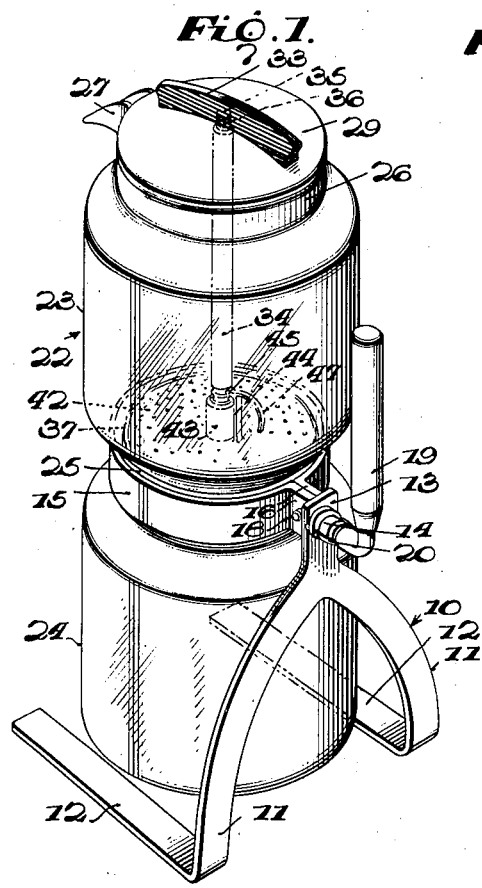
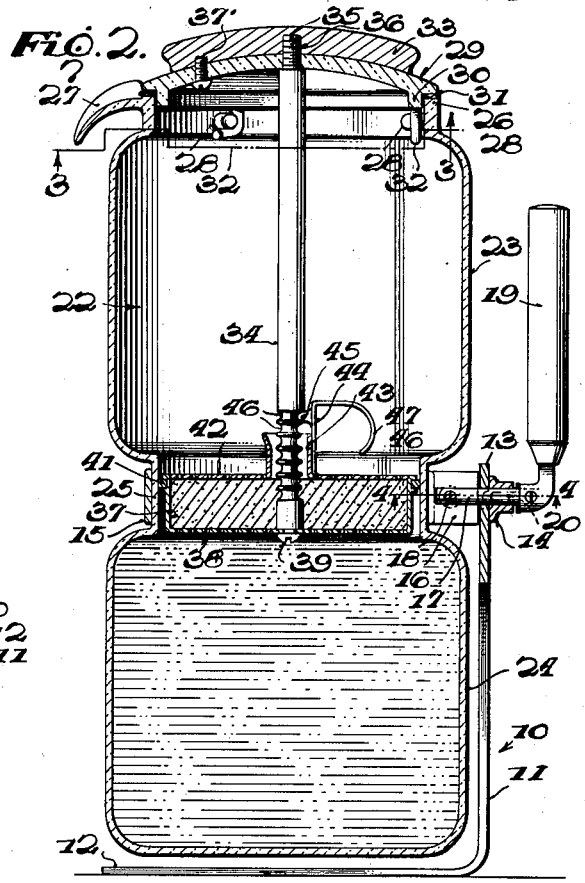
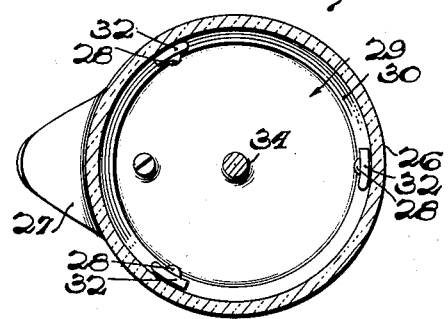
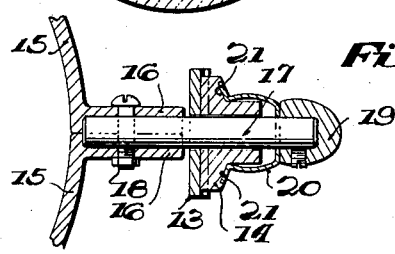
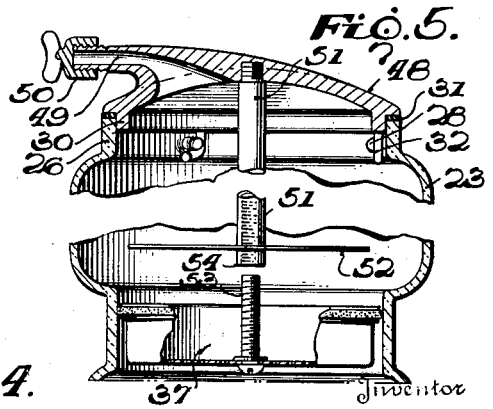
D. R. P. Heaton.

March 4, 1941. D. R. P. HEATON 2,233,528
DEVICE FOR MAKING COFFEE OR THE LIKE
Filed Oct. 6, 1939  2 Sheets-Sheet 2
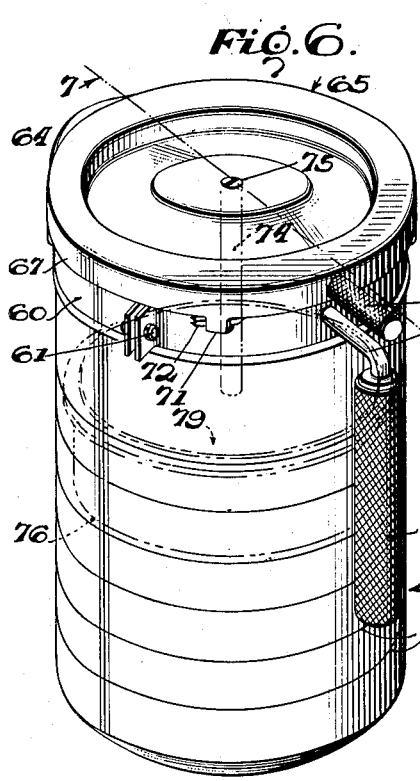
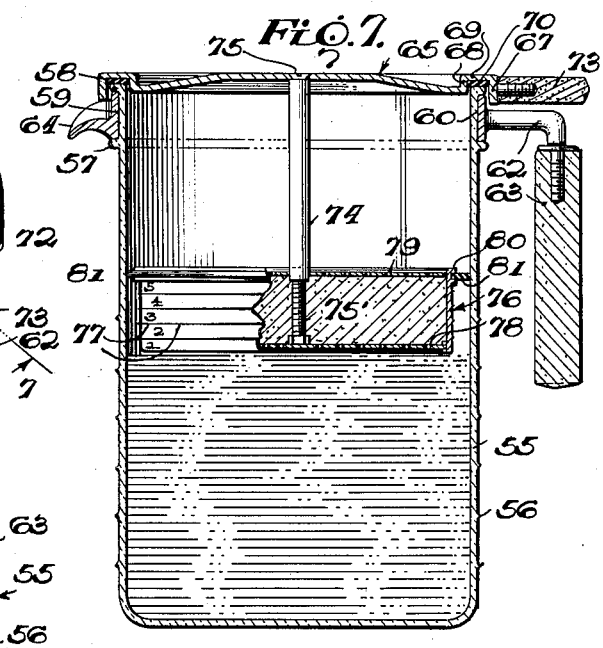
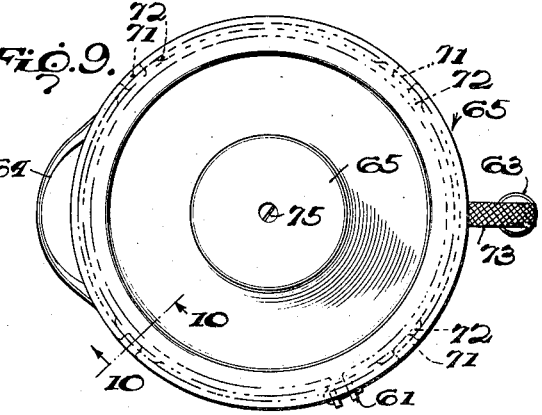
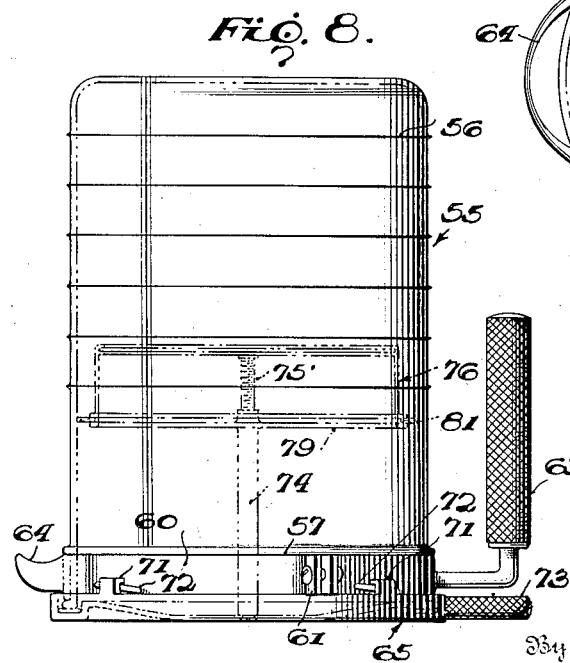
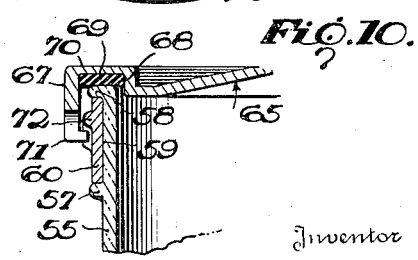
Inventor
D. R. P. Heaton.
Attorney Patented Mar. 4, 1941

2,233,528

UNITED STATES PATENT OFFICE 2,233,528

DEVICE FOR MAKING COFFEE OR THE LIKE

Dwight Ruggles Perry Heaton, Sand Hills, Mass.

Application October 6, 1939, Serial No. 298,318

6 Claims. (Cl. 53—3)

My invention relates to a device for making coffee or the like.

An important object of the invention is to provide a device of the above mentioned character which may be manipulated to cause the water to pass by gravity through a mass of ground coffee.

A further object of the invention is to provide means whereby the water may be passed through the mass of coffee any suitable number of times.

A further object of the invention is to provide means for receiving and holding masses of ground coffee, which may vary in volume, in such a manner that the water may be properly and uniformly passed through the mass.

A further object of the invention is to provide a device of the above mentioned character which is of simple construction, convenient to manipulate, and economical in the use of fuel.

Other objects and advantages of the invention will be apparent during the course of the following description.

In the accompanying drawings forming a part of this application and in which like numerals are employed to designate like parts throughout the same, Figure 1 is a perspective view of a coffee making device embodying my invention, Figure 2 is a central vertical section through the same, Figure 3 is a horizontal section taken on line 3—3 of Figure 2, Figure 4 is a similar view taken on line 4—4 of Figure 2, Figure 5 is a central vertical longitudinal section through a modified form of coffee making device embodying my invention, parts broken away, Figure 6 is a perspective view of a further modified form of the invention, Figure 7 is a vertical section taken on line 7—7 of Figure 6, Figure 8 is a side elevation of the device, inverted, with respect to Figure 6, Figure 9 is a plan view of the device with respect to Figure 6, and, Figure 10 is a detail section taken on line 10—10 of Figure 9.

In the drawings, wherein for the purpose of illustration is shown a preferred embodiment of my invention, the numeral 10 designates a stand, including downwardly diverging legs 11, carrying spaced horizontal feet 12, to be arranged upon a stove or the like upon opposite sides of the burner element. At their upper ends, the legs 11 merge into a vertical strap 13, having a bearing 14 rigidly secured thereto and arranged upon its outer side, as shown.

The numeral 15 designates a circular band or ring, which is split and provided adjacent to its ends with outwardly projecting radial knuckles 16. These knuckles are spaced and received therebetween the end of a horizontal shaft 17. The knuckles 16 and shaft 17 are rigidly secured together by a bolt 18 or the like. The shaft 17 is rotatably held within the bearing 14, and a handle or crank 19 is rigidly mounted upon the outer end of the shaft 17. The shaft 17 has a U-shaped catch 20, which is resilient and is fixedly secured thereto to rotate therewith. The ends of the U-shaped catch releasably engage within depressions 21 formed in the bearing 14. The depressions are arranged in a horizontal plane so that when the resilient catch 20 engages therein such catch will hold the handle 19 in the upper or lower vertical position, but will release this handle when suitable pressure is applied thereto.

The device comprises a container or receptacle 22, preferably formed of glass although the same may be formed of metal or any other suitable material. This container comprises opposed chambers 23 and 24, connected by a contracted intermediate portion 25, the parts 23, 24 and 25 being integral, and these parts also being cylindrical, although the shape may be varied. The intermediate contracted portion 25 is securely held within the band 15. The outer end of the chamber 24 is closed, as shown, while the outer end of the chamber 23 is open and is provided with a cylindrical flange 26, preferably equipped with a spout 27, disposed at 180° from the handle 19. The flange 26 also preferably is equipped with lugs or pins 28, arranged upon the inner side thereof and formed integral therewith. If desired, the spout 27 and lugs 28 may be formed separate from the flange 26 and secured thereto by any suitable means, and the invention is in no sense restricted to the arrangement as shown in the drawings.

The outer end of the chamber 23 is covered by a cap or top or cover 29, preferably formed of glass although it may be formed of any suitable material. This cover has a flange 30 to telescope with the flange 26, and the flange 30 carries a gasket 31, to effect a water-tight joint. The cover 29 carries depending L-shaped fingers 32, preferably integral therewith, to engage with the pins 28 and to draw the cover 29 downwardly for effecting a water-tight joint with the gasket.

The fingers 32 and pins 28 produce a releasable bayonet joint.

Arranged upon the top of the cover 29 is a handle or rib 33, formed of Bakelite or the like, for turning the cover. Arranged concentrically within the chamber 23 is a rod 34, extending longitudinally of the chamber, and having a reduced screw-threaded portion 35, engaging within an opening 36 formed in the handle 33. A screw 37' is also employed to secure the handle 33 to the cover 29. The rod 34 is sufficiently long to extend through the chamber 23 and through the reduced intermediate portion 25 and terminates at the inner end of the chamber 24.

The numeral 37 designates a basket for holding the ground coffee mass or the like. This basket may be formed of any suitable material and is preferably cylindrical and its periphery is imperforate while its bottom 38 is perforated. The bottom 38 is rigidly attached to the rod 34 by a screw 39 or the like. The basket 31 is concentric with respect to the reduced intermediate portion 25 and is of a smaller diameter than the same to be moved into and out of the reduced intermediate portion 25. The basket 37 is equipped with flanges 40, forming a channel to receive compressible packing 41. When this packing engages within the contracted portion 25 it prevents the passage of water from one chamber to the other exteriorly of the basket 37. The basket has a cover 42, which is perforated, and this cover is adapted to telescope with the basket 37 and to be moved into the basket toward its perforated bottom 38. The cover 42 has substantially a sliding fit with the basket 37. The cover 42 is provided with a sleeve 43, extending upwardly from the same, Figure 2, and surrounding the rod 34. The sleeve 43 has a resilient arm or spring 44 secured thereto, as shown. The spring 44 carries a dog or lug 45, to enter a selected annular groove 46. The annular grooves 46 are formed upon the rod 34, in an elongated group, as shown. The spring 44 may be equipped with a trigger 47, as shown.

In Figure 5, I have shown a slight modification of the invention. In this figure the chamber 23 is provided with a cover 48, corresponding to the cover 29. The cover 48 has a tubular spout 49 closed by a removable cap 50.

A rod 51 is rigidly secured to the cap 48 and carries a cover 52, corresponding to the cover 42. The cover 52 is rigidly attached to the rod 51 and is apertured and is stationary with relation to the basket 37. The basket 37 is rigidly secured through a screw 53, having screw-threaded engagement within the bore 54 of the lower tubular portion of the rod 51. By rotating the basket 38 the screw 53 will feed into the tubular end of the rod 51 and the cover 52 will have the basket 38 moved upwardly about the same.

The operation of the first form of the invention is as follows:

The cover 29 is turned for separating the same from the flange 26 and is then moved upwardly to withdraw the basket 37 from within the container. The lower chamber 24 is filled with water preferably up to the level indicated. The cover 42 is moved from within the basket 37 and the desired amount of ground coffee introduced into the basket. The cover 42 is then moved toward the basket and will enter the basket, to an extent determined by the amount of ground coffee present. It is thus apparent that by moving the cover 42 downwardly into the basket the mass of coffee may be held in place against displacement and hence such mass will have a uniform vertical thickness throughout its entire area. This will cause the water to pass through the mass of coffee in a uniform manner throughout the entire area of the mass. When the basket is thus charged with the ground coffee and the cover is in the closed position therein, the basket 37 is inserted into the contracted portion 25 and the cover 29 secured to the flange 26. The compressible packing 41 now engages within the contracted portion 25. The device may be placed upon a stove over a burner element and the water in the lower chamber 24 suitably heated, and this may occur before or after the filled basket 37 is placed in position. The water being properly heated the cover 29 is turned to form a gas tight joint, the device is preferably shifted from over the burner element, and the container 22 inverted by the manipulation of the handle 19. The chamber 24 then becomes the upper chamber and the water will pass through the coffee mass held within the basket 37 by gravity and be collected in the then lower chamber 23. The container may again be inverted so that it will occupy the position shown in Figure 2 and the water will then pass by gravity through the coffee mass from the chamber 23 into the chamber 24. The passage of the water through the coffee mass may be effected any suitable number of times. After the coffee has been drawn, the cover 29 and the basket are removed, and the coffee may be poured through the spout 27.

The operation of the device shown in Figure 5 is so similar to the first form of the device that no further description is necessary. All other parts of the device in Figure 5 remain identical with those shown and described in Figures 1 to 4 inclusive, excepting those parts previously described in detail in Figure 5.

In Figures 6 to 10 inclusive, I have shown a third modified form of the invention comprising a container or receptacle 55, preferably formed of glass, and preferably cylindrical. The container 55 has its bottom closed and its top open, and the container is provided with graduations 56, as shown. The container or receptacle is provided at its upper end with annular flanges 57 and 58, spaced as shown, to provide an annular groove 59, receiving a split preferably metallic band 60. The ends of this split band are connected and contracted by a bolt 61 or the like. Rigidly connected with the band 60 is an L-shaped shank 62, having a handle 63 rigidly secured thereto. This handle is preferably formed of heat non-conducting material. The handle 63 extends longitudinally of the receptacle 55 and is spaced therefrom in parallel relation. The handle 63 extends from the upper end of the receptacle to a point substantially equidistantly spaced from the top and bottom of the receptacle. The metallic band 60 carries a spout 64, preferably formed integral therewith.

The numeral 65 designates a lid or cover, preferably formed of metal or any other suitable material, and provided at its marginal edge with a depending annular flange 67 forming with a shoulder 68, an annular groove 69, to receive packing 70. The flange 67 carries L-shaped lugs 71, rigidly secured thereto, and these lugs are adapted to engage beneath inclined ribs 72, formed upon the outer surface of the band 60, and preferably integral therewith. A handle 73 extends radially of the cover or lid 65 and is rigidly secured thereto. The handle 73 is preferably formed of heat insulating material.

Arranged upon the inner side of the lid 65 and concentric thereto is a tube 74, rigidly attached to the lid by a screw 75 or the like. This tube is internally threaded to receive a screw 75'. The numeral 76 designates a cylindrical basket, for holding the coffee or the like and this basket may be formed of glass and may be graduated, as shown at 77. The bottom of the basket may be in the form of a metal disc 78, rigidly attached to the lower end of the basket by any suitable means. The disc 78 is perforated and is rigidly attached at its center to the screw 75'. The numeral 79 designates a disc, which is perforated, and rigidly attached to the lower end of the tube 74. The disc 79 is perforated and telescopes the basket 76, preferably having a sliding fit therewith. The basket 76 is provided at its top, Figure 7, with a groove 80, receiving a packing ring 81, adapted to slidably engage the inner side of the receptacle 55 and provide a water-tight joint therewith.

The operation of this form of the device is as follows:

With the cover or lid 65 removed from the receptacle 55, the basket 76 may be separated from the tube 74, and the desired amount of ground coffee or the like introduced into the same, as indicated by the selected graduation 77. The basket 76 is then applied to the tube 74 and by rotating the same the screw 75 enters the tube 74 and the disc 78 is moved toward the disc 79, until these two discs properly engage with the coffee to hold it against displacement. The desired amount of water is now introduced into the receptacle 55 as may be indicated by the selected graduation 56. The cover or lid 65 may be now applied to the top of the receptacle, but not having a gas tight fit therewith, and the receptacle 55 may be placed upon a burner for heating the water. After the water is heated or boiled, the lid is turned so that the lugs 71 engage beneath the inclined ribs 72, to form a gas tight joint. After this is done, the receptacle is removed from the burner and the same may be inverted, Figure 8. This will cause the water to pass through the mass of coffee. The receptacle may be inverted any number of times.

It is to be understood that the forms of my invention herewith shown and described are to be taken as preferred examples of the same and that various changes in the shape, size, and arrangement of parts may be resorted to without departing from the spirit of my invention or the scope of the subjoined claims.

Having described my invention, what I claim is:

1. A device for making coffee or the like, comprising a container having one end open, a cover detachably connected to the open end of the container to close it, a member secured to the cover and arranged within the container and having a tubular part, a basket having a perforated bottom arranged within the container, and a screw secured to the basket and having screw-threaded engagement within the tubular part, a disc attached to the member and extending into the basket, a relative longitudinal movement between the disc and basket being effected by turning the screw.

2. A device for making coffee or the like, comprising a container having one end open, a cover detachably connected with the open end to close it, a member arranged within the container and attached to the cover and having a tubular part, a basket arranged within the container and having a perforated bottom, a screw secured to the perforated bottom to rotate therewith and having screw-threaded engagement within the tubular part, and a disc attached to the member, a relative longitudinal movement between the disc and basket being effected by rotating the basket with relation to the member.

3. A device for making coffee or the like, comprising a substantially transparent container having graduations for indicating the amount of water supplied thereto, said container having one end open, a removable cover for the open end of the container, a substantially transparent basket having graduations to indicate the amount of coffee or the like supplied thereto, said basket having a foraminous bottom, a foraminous cover to be moved into the transparent basket for holding different amounts of coffee therein against undue displacement, means carried by the container cover to hold the basket within the container at a point spaced from the opposite ends of the container and the foraminous cover in a selected adjusted position within the basket, the container cover and the basket being removable as a unit from the container, the arrangement being such that a selected amount of water may be introduced into the container and a selected amount of coffee introduced into the basket and the water passed through the coffee by inverting the container.

4. A device for making coffee or the like, comprising a glass container having one end open and provided upon its periphery with graduations for indicating the amount of water introduced therein, a removable cover for the open end of the container, a glass basket to be arranged within the container and having its periphery provided with graduations to indicate the amount of coffee introduced therein, the basket having a foraminous bottom, a tube carried by the cover, a screw secured to the bottom of the basket and engaging within the tube, a perforated disk secured to the tube so that it cannot move longitudinally thereof and arranged to be received within the basket, the basket being moved longitudinally with relation to the container by turning the screw, and a washer carried by the basket and engaging the container, the arrangement being such that a selected amount of water may be introduced into the container and a selected amount of coffee within the basket and the water passed through the coffee by inverting the container.

5. A device for making coffee or the like, comprising a glass container having one end open and provided upon its periphery with graduations to indicate the amount of water introduced therein, a band surrounding the container adjacent to the open end and carrying a handle, a cover for the open end of the container and having means for detachable engagement with the band, a glass basket within the container and having its periphery provided with graduations to indicate the amount of coffee introduced therein, said basket having foraminous top and bottom, said basket having means to prevent substantially the passage of water from one end of the container to the other exteriorly of the basket, and means to support the basket from the cover of the container.

6. A device for making coffee or the like, comprising a portable container, a removable cover for one end of the container, a tube attached to the cover and removable with the cover as a unit, the tube extending into the container and having its free end free from connection with the closed end of the container, a perforated basket arranged within the container, a screw secured to the bottom of the perforated basket and held against longitudinal movement with relation to the basket and having screw-threaded engagement within the tube, a disc mounted upon the tube and held against movement longitudinally of the tube, the disc being adapted to move into the basket, the space between the disc and the bottom of the basket being varied by rotating the screw with respect to the tube, and means connected with the container so that the container may be inverted.

DWIGHT RUGGLES PERRY HEATON.